United States Patent
Park

(10) Patent No.: US 8,710,971 B2
(45) Date of Patent: Apr. 29, 2014

(54) CONTROL METHOD OF LPI LAMP FOR LPI VEHICLE AND LOGIC THEREFOR

(75) Inventor: Jungjoo Park, Gungpo-si (KR)

(73) Assignee: Hyundai Motor Company, Seoul (KR)

( * ) Notice: Subject to any disclaimer, the term of this patent is extended or adjusted under 35 U.S.C. 154(b) by 243 days.

(21) Appl. No.: 13/189,343

(22) Filed: Jul. 22, 2011

(65) Prior Publication Data

US 2012/0133499 A1     May 31, 2012

(30) Foreign Application Priority Data

Nov. 30, 2010    (KR) .................. 10-2010-0120722

(51) Int. Cl.
*B60Q 1/00*      (2006.01)
*G01M 15/00*    (2006.01)

(52) U.S. Cl.
USPC ...... 340/451; 340/438; 73/114.43; 73/114.51

(58) Field of Classification Search
USPC ................. 73/114.45–114.51; 340/438, 451
See application file for complete search history.

(56) References Cited

U.S. PATENT DOCUMENTS

| | | | | |
|---|---|---|---|---|
| 6,952,161 B1 * | 10/2005 | Williams | ................. | 340/463 |
| 6,986,334 B2 * | 1/2006 | Lee | ..................... | 123/198 D |
| 7,127,941 B2 * | 10/2006 | Shin | ...................... | 73/114.36 |
| 7,182,073 B1 * | 2/2007 | Kim | ................. | 123/527 |
| 2005/0241378 A1 * | 11/2005 | Shin et al. | ............. | 73/119 R |
| 2010/0010726 A1 * | 1/2010 | Orikabe | ................. | 701/103 |

FOREIGN PATENT DOCUMENTS

| | | | |
|---|---|---|---|
| JP | 2004-162709 A | | 6/2004 |
| JP | 2004-324600 A | | 11/2004 |
| JP | 2007285286 | * | 11/2007 |
| KR | 20-0222776 Y1 | | 5/2001 |
| KR | 2003-0041261 A | | 5/2003 |
| KR | 10-2004-0040756 A | | 5/2004 |
| KR | 10-2006-0035109 A | | 10/2004 |
| KR | 10-2005-0090287 A | | 9/2005 |
| KR | 10-0569984 B1 | | 4/2006 |
| KR | 10-2007-0028017 A | | 3/2007 |
| KR | 10-2009-0125956 A | | 12/2009 |

* cited by examiner

*Primary Examiner* — Benjamin C Lee
*Assistant Examiner* — Adam Carlson
(74) *Attorney, Agent, or Firm* — Morgan, Lewis & Bockius LLP

(57) ABSTRACT

A control method of an LPI lamp for an LPI vehicle and logic for the control method can turn on again an LPG switch when the LPG switch is unintentionally turned off, by making a driver recognize whether the LPG switch is turned off, by switching an LPI lamp on and off. For this configuration, the control method of an LPI lamp for an LPI vehicle includes checking whether an LPG switch that stops fuel supply to an engine has been turned on or off, and switching the LPI lamp on and off, when it is determined that the LPG switch has been turned off, in an LPI vehicle in an ignition-on state.

4 Claims, 2 Drawing Sheets

CONTROL METHOD OF LPI LAMP FOR LPI VEHICLE AND LOGIC THEREFOR

CROSS-REFERENCE TO RELATED APPLICATIONS

The present application claims priority to Korean Patent Application Number 10-2010-0120722 filed Nov. 30, 2010, the entire contents of which application is incorporated herein for all purposes by this reference.

BACKGROUND OF INVENTION

1. Field of Invention

The present invention relates to a control method of an Liquefied Petroleum Injection (LPI) lamp for an LPI vehicle and logic for the control method, and more particularly, to a control method of an LPI lamp for an LPI vehicle that can turn on again an Liquefied Petroleum Gas (LPG) switch when the LPG switch is unintentionally turned off, by making a driver recognize that the LPG switch is turned off and switch an LPI lamp on.

2. Description of Related Art

In general, LPI vehicles can be started, when fuel pressure that is the pressure of a fuel line for supplying fuel to the engine increases up to reference pressure Abar. Therefore, it is possible to make a driver know through cluster switching an LPI lamp on and off whether the fuel pressure is above the reference pressure.

FIG. 1 shows a timing diagram for the status of fuel pressure Pf, an LPI lamp L, and a key KEY. That is, when the fuel pressure Pf is less than the reference pressure Abar in an ignition-on state (IG ON), it is possible to make a driver prepare to start the engine by turning on the LPI lamp L of a cluster. It is possible to make the driver recognize that the engine can be started by turning off the LPI lamp L of the cluster, as soon as the fuel pressure Pf(X) becomes above the reference pressure Abar.

That is, the LPI lamp is used to inform a driver whether the engine can be started only in the early start.

Further, the LPI vehicles are equipped with an LPG switch to stop the fuel pump when the engine is in an abnormal critical situation. When the LPG switch has been turned off in the ignition-on state, the fuel pump stops and fuel cannot be supplied to the fuel line, such that the fuel pressure does not increase. Further, when the LPG switch is turned off while the engine starts, fuel supply is stopped and the engine of the vehicles stops.

The LPG switch is usually positioned above the driver's left knee, such that it may be turned off by a mistake of the driver getting in/out of the vehicle. Therefore, when the LPG switch is turned off by driver's mistake, the vehicle cannot be started unless the driver checks and turns it on.

The information disclosed in this Background of the Invention section is only for enhancement of understanding of the general background of the invention and should not be taken as an acknowledgement or any form of suggestion that this information forms the prior art already known to a person skilled in the art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a control method of an LPI lamp for an LPI vehicle that can turn on an LPG switch again when the LPG switch is unintentionally turned off, by making a driver recognize whether the LPG switch is turned off, by switching an LPI lamp on and off, and logic for the control method.

Further, the present invention has been made in an effort to provide a control method of an LPI lamp for an LPI vehicle that can allow for checking a problem in a vehicle by switching the LPI lamp on and off such that a driver recognizes a danger in starting the engine, when fuel pressure is abnormally decreased or a problem occurs in an LPG switch circuit, and logic for the control method.

Various aspects of the present invention provide for a control method of an LPI lamp for an LPI vehicle, which comprises checking whether an LPG switch that can stop fuel supply to an engine has been turned on or off, and switching the LPI lamp on and off, when it is determined that the LPG switch has been turned off, in an LPI vehicle in an ignition-on state, and logic for the control method.

The control method of an LPI lamp for an LPI vehicle may further include checking whether fuel pressure of a fuel line for supplying fuel to the engine has decreased less than reference pressure, when the engine is started and the vehicle is in a common traveling mode, with the LPG switch on and the LPI lamp off, and informing a driver that the fuel pressure is less than the reference pressure by switching the LPI lamp on and off, when the fuel pressure is less than the reference pressure.

Checking whether a problem has occurred in an LPG switch circuit for activating the LPG switch and informing the driver that a problem has occurred in the LPG switch circuit by switching the LPI lamp on and off may be performed, when the fuel pressure is above the reference pressure.

Before whether the LPG switch of the LPI vehicle that is in an ignition-on state has been turned off, whether the fuel pressure of the fuel line is above the reference pressure may be checked, and when the fuel pressure is less than the reference pressure, the switching of the LPI lamp on and off is performed and then whether the LPG switch has been turned on or off may be checked.

When the fuel pressure is above the reference pressure, the LPI lamp may be turned off, and when the engine is started, the vehicle may travel in the common traveling mode.

According to various aspects of the present invention, it is possible to turn on again an LPG switch when the LPG switch is unintentionally turned off, by making a driver recognize whether the LPG switch is turned off, by switching an LPI lamp on and off.

Further, according to various embodiments of the present invention, it is possible to allow for checking a problem in a vehicle by switching the LPI lamp on and off such that a driver recognizes a danger in starting the engine, when fuel pressure is abnormally decreased or a problem occurs in an LPG switch circuit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
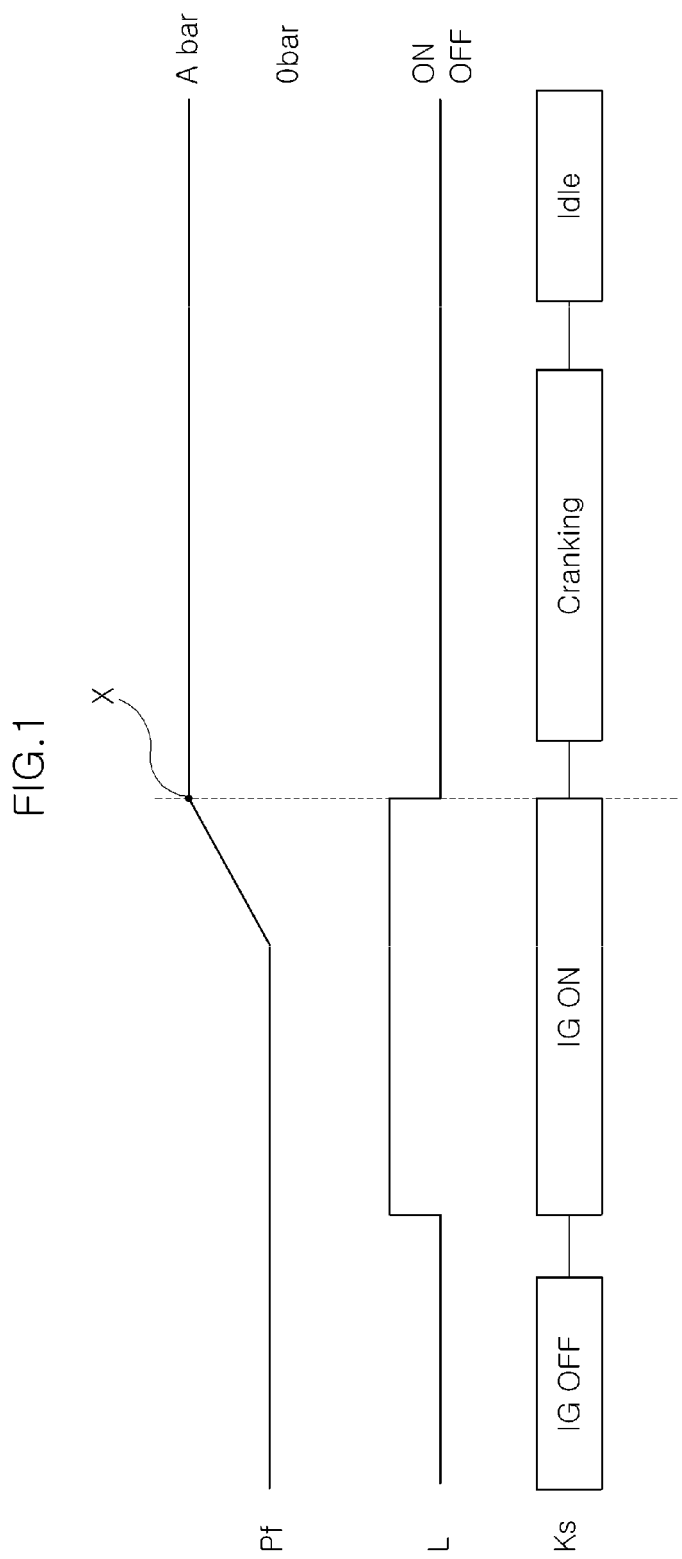
FIG. 1 is a timing diagram of controlling a common LPI lamp.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
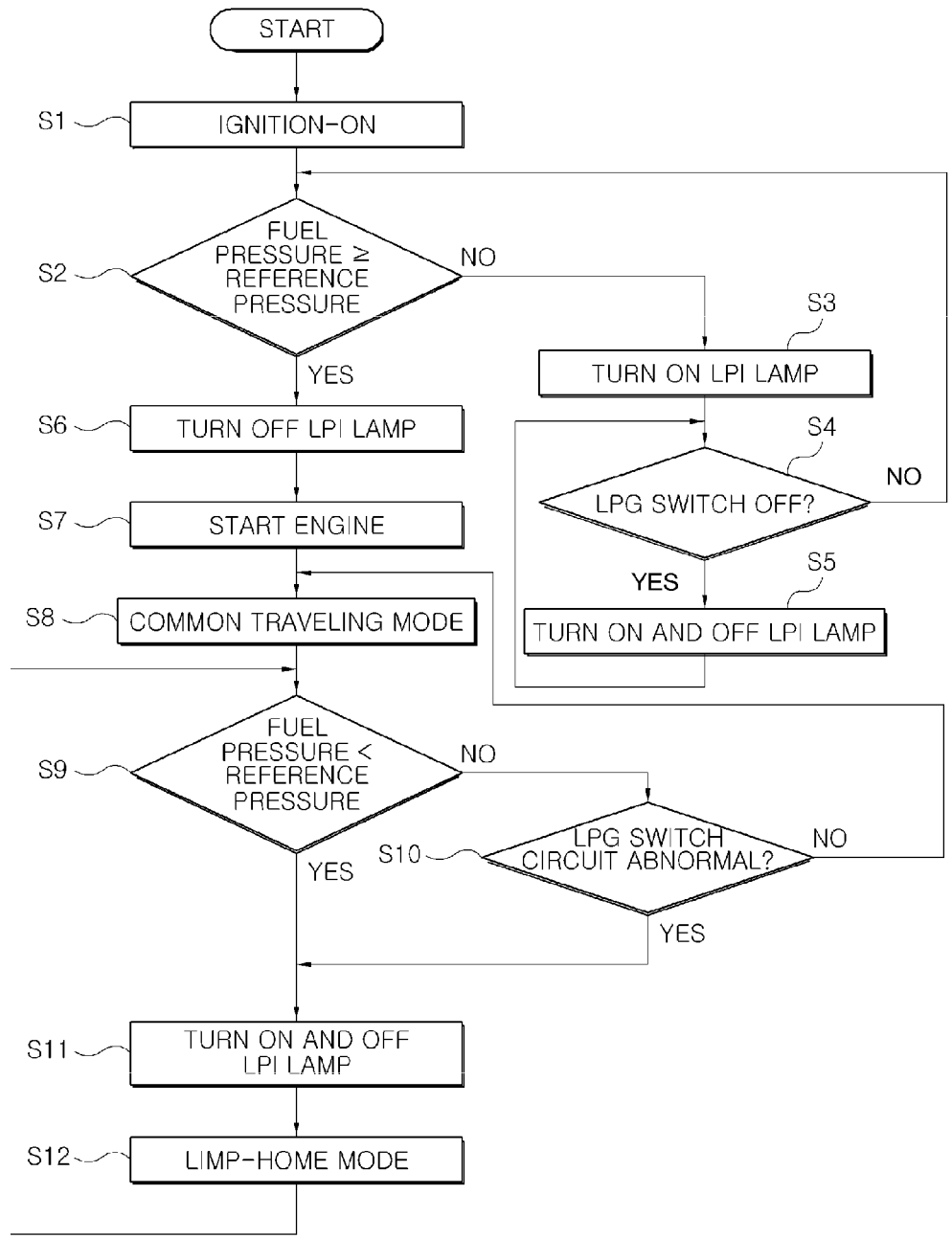
FIG. 2 is a flowchart illustrating an exemplary control method of an LPI lamp for an LPI vehicle according to the present invention and logic for the control method.

FIG. 2 shows a flowchart illustrating a control method of an LPI lamp for an LPI vehicle according to various embodiments of the present invention and logic for the control method. As shown in FIG. 2, a control method of an LPI lamp for an LPI vehicle and logic for the control method checks first whether the fuel pressure of a fuel line becomes larger than reference pressure to supply fuel to an engine, for early engine start (S2), when the LPI vehicle becomes in an ignition-on state (S1).

When the fuel pressure is less than the reference pressure, it is possible to inform a driver that the fuel pressure is less than a level where the engine can be started, by switching an LPI lamp of a cluster on and off (S3). As described above, by informing the driver of the fact by switching the LPI lamp on and off (S3), when the fuel pressure is less than the reference pressure, it is possible to prevent wear of a starter motor due to starting the engine when the fuel pressure is less than the reference pressure. The reference pressure may be set to 5 bar where the engine can be started.

Further, it is checked whether, with the fuel pressure below the reference pressure, the pressure does not increase yet, although the fuel is supplied to the fuel line by operation of the fuel pump after the ignition-on state, and whether the LPG switch that can stop the fuel pump has been turned off (S4). That is, it is checked whether the fuel pressure does not increase because the LPG switch has been turned off or whether although the LPG switch has been turned on, the pressure of the fuel line does not increase yet, from whether the LPG switch has been turned off or on (S4).

As described above, when the LPG switch has been turned off in the ignition-on state before the engine starts, it is informed to the driver that the engine cannot be started because the LPG switch has been turned off, by switching the LPI lamp on and off (S5).

The LPG switch is a switch that stops the fuel pump when the engine is in an abnormal critical situation. When the LPG switch has been turned off in the ignition-on state, the fuel pump stops and fuel cannot be supplied to the fuel line, such that the fuel pressure does not increase. Further, when the LPG switch is turned off while the engine starts, fuel supply is stopped and the engine of the vehicles stops. The LPG switch can be turned on and off by operation of a driver.

Switching the LPI lamp on and off (S5) continues until the LPG switch is turned on, and it is possible to turn on the LPG switch again by informing it such that the driver recognize, when the LPG switch is unintentionally turned off.

Further, when the LPG switch has been turned on, it is determined that the fuel pressure does not increase yet, with the fuel pump in operation, it is check again whether the fuel pressure is above the reference pressure, with the LPI lamp turned on (S3), until the fuel pressure increases above the reference pressure (S2).

Further, when the LPI lamp has been turned on (S3) or turned on and off (S5) in the ignition-on state before the engine starts, an engine controller that controls the operation of the engine is kept locked in order to prevent the engine from being started by operation of the driver.

Further, when the fuel pressure becomes above the reference pressure, with the LPI lamp turned on (S3), it is possible to inform the driver that the fuel pressure becomes above the reference pressure and the engine can be started, by turning off the LPI lamp of the cluster (S6).

Further, even if the fuel pressure becomes above the reference pressure right after the LPI lamp is turned on (S3) after the ignition-on state (S1), the LPI lamp is kept on for a first predetermined delay time and is turned off after the first predetermined delay time (S6) in order not to make the driver confused.

Further, when the engine is restarted before soaking, the increase speed of the fuel pressure decreases, such that the LPI lamp is turned off after the delay time is maintained for a second predetermined delay time (S6).

As described above, as the LPI lamp is turned off (S6), the engine controller that controls the operation of the engine is unlocked such that the driver can start the engine. Accordingly, the engine can be started by the driver (S7).

Further, when the engine is started by the driver (S7), the vehicle can travels in a common traveling mode (S8). As described above, when the engine is started (S7) and the vehicle travels in the common traveling mode (S8), it is checked whether the fuel pressure has decreased under the reference pressure (S9). Further, when the fuel pressure abnormally decreases less than the reference pressure, with the engine started, it is possible to inform the driver that the fuel pressure has become less than the reference voltage by switching the LPI lamp on and off (S11).

Further, when the engine has been started and the vehicle travels, as described above, and the fuel pressure abnormally decreases and the LPI lamp is switched on and off (S11), the engine controller can prevent the vehicle from rapidly stopping by keeping the normal control.

Further, when the fuel pressure is above the reference pressure, it is checked whether a problem has occurred in the LPG switch circuit that controls the operation of the fuel pump by activating the LPG switch (S10). In checking whether a problem has occurred in the LPG switch circuit, it is determined that there is a problem in the circuit, when a pump relay that is turned on/off by the LPG switch is not operated in accordance with turning-on/off of the LPG switch, the fuel pump fails to operate, or a problem is measured in the circuit by sensors.

Further, when it has been determined that there is a problem in the LPG switch circuit, it is possible to allowing for checking a problem in the vehicle by informing the driver that there has been a problem, by switching the LPI lamp on and off (S11).

It is possible to control the speed of switching the LPI lamp on and off by modulating the frequency of a signal applied to the LPI lamp, such that the driver can determine whether the LPG switch is turned off, the fuel pressure decrease, and there is a problem in the LPG switch circuit.

Further, when there is no problem in the LPG circuit, the LPI lamp is kept off and the vehicle continues traveling in the common traveling mode (S8).

Further, the vehicle is switched to travel in a limp-home mode (S12), when the fuel pressure becomes abnormally less than the reference pressure after the engine is started (S7), and a problem has occurred in the LPG switch circuit and the LPI lamp is switched on and off (S11).

Further, while the vehicle travels in the limp-home mode, when the fuel pressure becomes above the reference pressure and the problem in the LPG switch circuit is removed, the LPI lamp is turned off and the vehicle is switched to travel in the common traveling mode (S8).

That is, when there is no problem in the LPG switch, the LPG switch driving circuit, and the fuel pressure, the LPI lamp is turned off (S8) and the vehicle travels in the limp-home mode.

It is possible to turn the LPG switch on again, when the LPG switch is unintentionally turned off, by switching the LPI lamp on and off such that the driver recognizes that the LPG switch has been turned off, as described above. Further, it is possible to allow for checking a problem in the vehicle by switching the LPI lamp on and off such that the driver can recognize that there is a danger in the operation of the engine, when the fuel pressure abnormally decreases or a problem occurs in the LPG switch circuit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of a Liquefied Petroleum Injection (LPI) lamp for an LPI vehicle, the method comprising:
    providing a Liquefied Petroleum Gas (LPG) switch that can stop fuel supply to an engine;
    checking whether the LPG switch has been turned on or off;
    if the LPG switch is off and the vehicle is in an ignition-on state, switching the LPI lamp on and off for blinking to inform a driver that the LPG switch has been turned off; and
    if the LPG switch is on, the LPI lamp is off, the engine has been started and the vehicle is in a common traveling mode, checking whether fuel pressure of a fuel line for supplying fuel to the engine has decreased to less than a reference pressure;
    switching the LPI lamp on and off, if the fuel pressure has decreased to less than the reference pressure, to inform the driver that an abnormal decrease of the fuel pressure has occurred; and
    checking, if the fuel pressure is above the reference pressure, whether a problem has occurred in an LPG switch circuit for activating the LPG switch, and switching the LPI lamp on and off for blinking to inform the driver if a problem has occurred in the LPG switch circuit.

2. The control method of an LPI lamp for an LPI vehicle as defined in claim 1, the control method further comprising:
    checking whether the fuel pressure of the fuel line is above the reference pressure before checking whether the LPG switch has been turned on or off; and
    turning on the LPI lamp and then proceeding to the checking of whether the LPG switch has been turned on or off when the fuel pressure is less than the reference pressure.

3. The control method of an LPI lamp for an LPI vehicle as defined in claim 2, wherein when the fuel pressure is above the reference pressure, the LPI lamp is turned off, and then the engine is started, the vehicle travels in the common traveling mode.

4. Control logic of an LPI lamp controlling an LPI lamp by using the control method of an LPI lamp for an LPI vehicle as defined in claim 1 and logic for the control method.

* * * * *